US012280769B2

(12) United States Patent
Furuya et al.

(10) Patent No.: US 12,280,769 B2
(45) Date of Patent: Apr. 22, 2025

(54) DRIVING ASSIST DEVICE

(71) Applicant: SUBARU CORPORATION, Tokyo (JP)

(72) Inventors: Takahiro Furuya, Tokyo (JP); Hideki Sugawara, Tokyo (JP); Anfen Ye, Tokyo (JP); Kazuki Yamaguchi, Tokyo (JP); Wataru Matsudate, Tokyo (JP); Hayato Hori, Tokyo (JP); Takayuki Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 217 days.

(21) Appl. No.: 18/068,121

(22) Filed: Dec. 19, 2022

(65) Prior Publication Data

US 2023/0227026 A1    Jul. 20, 2023

(30) Foreign Application Priority Data

Jan. 20, 2022   (JP) ................................ 2022-007428

(51) Int. Cl.
*B60W 30/09*     (2012.01)
*B60W 30/095*    (2012.01)
*B60W 30/18*     (2012.01)
*B60W 50/00*     (2006.01)

(52) U.S. Cl.
CPC ........ *B60W 30/09* (2013.01); *B60W 30/0956* (2013.01); *B60W 30/18159* (2020.02); *B60W 50/0097* (2013.01); *B60W 2554/4045* (2020.02); *B60W 2554/4046* (2020.02)

(58) Field of Classification Search
CPC . B60W 30/09; B60W 30/0956; G01S 17/931; G08G 1/166; B60Y 2300/18158
See application file for complete search history.

(56) References Cited

U.S. PATENT DOCUMENTS

2019/0243371 A1*  8/2019  Nister ................... G05D 1/65
2023/0286478 A1*  9/2023  Inami .................... B60T 7/12

FOREIGN PATENT DOCUMENTS

JP           2017-224055 A        12/2017

* cited by examiner

*Primary Examiner* — Kenneth J Malkowski
(74) *Attorney, Agent, or Firm* — Rimon P.C.

(57) ABSTRACT

A driving assist device includes a driving assist controller. The driving assist controller is configured to perform driving assistance when the vehicle changes a course by crossing the oncoming lane. The driving assist controller sets a predicted travel region based on behavior of the oncoming vehicle when the oncoming vehicle is approaching the vehicle that enters an intersection. When the vehicle enters the predicted travel region in a travel path of the vehicle, the driving assist controller determines whether there is a possibility of contact between the vehicle and the oncoming vehicle based on the predicted travel region and the travel path of the vehicle. The driving assist controller causes the vehicle to stop outside of the predicted travel region when there is a possibility of the contact.

5 Claims, 7 Drawing Sheets

DRIVING ASSIST DEVICE

CROSS-REFERENCE TO RELATED APPLICATIONS

The present application claims priority from Japanese Patent Application No. 2022-007428 filed on Jan. 20, 2022, the entire contents of which are hereby incorporated by reference.

BACKGROUND change in a case w The present disclosure relates to a driving assist device configured to continue a course here a host vehicle is going to change course to a direction crossing an oncoming lane and an advancing region of an approaching oncoming vehicle is estimated and no imminent contact is determined.

With a known driving assist device, in a case where a host vehicle goes to change course to a direction (right-turn direction on a road in a left-hand traffic jurisdiction) crossing an oncoming lane after entering an intersection, a vehicle (oncoming vehicle) traveling in the oncoming lane is recognized and the possibility of contact between the host vehicle and the oncoming vehicle is determined. In a case where the possibility is high, this is reported to the driver. In a case where no imminent contact is determined, the course change is continued. Such a technique is described in Japanese Unexamined Patent Application Publication (JP-A) 2017-224055 and the like.

At this time, in a case where it becomes clear that the oncoming vehicle having entered the intersection will change course to a direction crossing the lane where the host vehicle is traveling, the host vehicle is able to change course to a direction crossing the oncoming lane. This is because there is no possibility of the host vehicle and the oncoming vehicle coming into contact even if the oncoming vehicle has entered the intersection. Accordingly, for example, in a case where the oncoming vehicle is traveling in a straight ahead/right turn only lane or a right turn only lane on a road in a left-hand traffic jurisdiction and a right blinker is on, after the oncoming vehicle has entered the intersection, the host vehicle can turn right without waiting for the oncoming vehicle to pass.

SUMMARY

An aspect of the disclosure provides a driving assist device. The driving assist device includes a traveling environment information acquisition unit, an oncoming vehicle information acquisition unit, and a driving assist controller. The traveling environment information acquisition unit is configured to acquire traveling environment information about a traveling environment ahead of a vehicle. The oncoming vehicle information acquisition unit is configured to acquire information about an oncoming vehicle traveling in an oncoming lane. The driving assist controller is configured to perform driving assistance when the vehicle changes a course by crossing the oncoming lane. The driving assist controller includes a predicted travel region setting unit, a contact determination unit, and a stopping controller. The predicted travel region setting unit is configured to set a predicted travel region based on vehicle behavior of the oncoming vehicle when the vehicle enters an intersection and the oncoming vehicle approaching the vehicle that enters the intersection is detected based on the information about the oncoming vehicle acquired by the oncoming vehicle information acquisition unit. The contact determination unit is configured to, when the vehicle enters the predicted travel region in a travel path of the vehicle, determine whether there is a possibility of contact between the vehicle and the oncoming vehicle based on the predicted travel region set by the predicted travel region setting unit and the travel path of the vehicle. The stopping controller is configured to bring the vehicle to a stopped state outside of the predicted travel region when the contact determination unit determines that there is the possibility of the contact between the vehicle and the oncoming vehicle.

An aspect of the disclosure provides a driving assist device. The driving assist device includes circuitry. The circuitry is configured to acquire traveling environment information about a traveling environment ahead of a vehicle. The circuitry is configured to acquire information about an oncoming vehicle traveling in an oncoming lane. The circuitry is configured to perform driving assistance when the vehicle changes a course by crossing the oncoming lane. The circuitry is configured to set a predicted travel region based on vehicle behavior of the oncoming vehicle when the vehicle enters an intersection and the oncoming vehicle approaching the vehicle that enters an intersection is detected based on the information about the acquired oncoming vehicle. The circuitry is configured to, when the vehicle enters the predicted travel region in a travel path of the vehicle, determine whether there is a possibility of contact between the vehicle and the oncoming vehicle based on the set predicted travel region and the travel path of the vehicle. The circuitry is configured to, upon determining there is a possibility of the contact between the vehicle and the oncoming vehicle, bring the vehicle to a stopped state outside of the predicted travel region.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

After the travel path of an oncoming vehicle is predicted from vehicle behavior and no imminent contact with the host vehicle is determined, if the travel path of the oncoming vehicle deviates from the predicted travel path when the host vehicle goes to cross the oncoming lane, there is a possibility of contact with the host vehicle. That is, even in a case where the oncoming vehicle approaches with the blinker turned on for the side that crosses the lane where the host vehicle is traveling or the oncoming vehicle is traveling in a right turn only lane on a road in a left-hand traffic jurisdiction, the oncoming vehicle may travel straight ahead.

In such a case, the driving assist device activates the Autonomous Emergency Braking (AEB) to avoid contact with the oncoming vehicle, flustering the driver and occupants.

It is desirable to provide a driving assist device that can avoid contact with an oncoming vehicle without flustering a driver and occupant and allows the host vehicle to cross an oncoming lane, even in a case where the oncoming vehicle travels in a manner that deviates from a blinker light and road travel information.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Note that the present embodiment is described assuming left-hand traffic. Thus, left and right is intended be interchanged when applying the present embodiment to a right-hand traffic jurisdiction.

Figure 1:
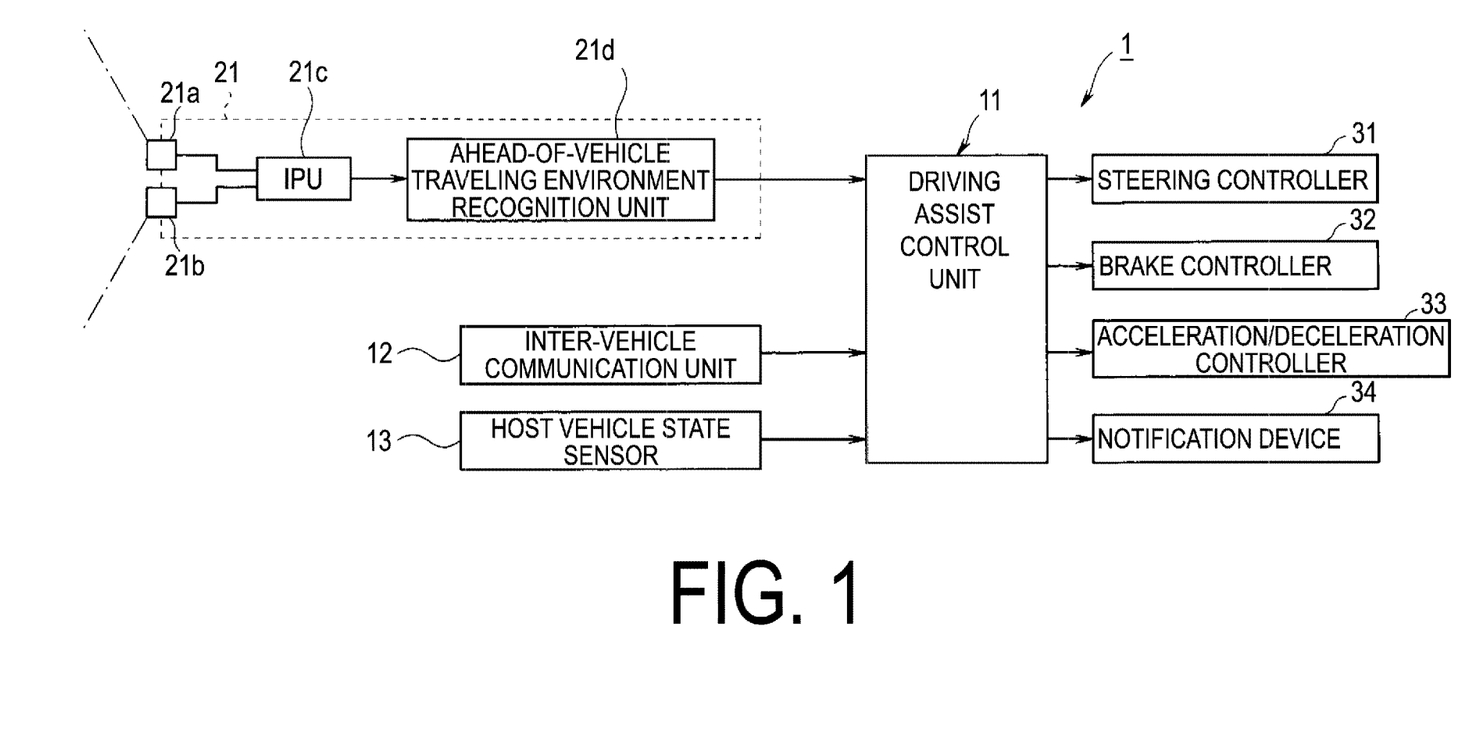
FIG. 1 is a schematic configuration diagram of a driving assist device.

A driving assist device 1 illustrated in FIG. 1 is installed in a host vehicle M (see FIGS. 3 to 6). The driving assist device 1 includes a driving assist control unit 11 and a camera unit 21. The driving assist control unit 11 and an ahead-of-vehicle traveling environment recognition unit 21*d* described below are constituted by microcontrollers including a CPU, RAM, ROM, rewritable non-volatile memory (flash memory or EEPROM), and peripheral units. The ROM stores programs, fixed data, and the like necessary for the CPU to execute various processing. The RAM is provided as a working area of the CPU and temporarily stores various types of data in the CPU. Note that the CPU is also referred to as a microprocessor (MPU) or a processor. Also, a graphics processing unit (GPU) or a graph streaming processor (GSP) may be used instead of the CPU. Alternatively, a CPU, a GPU, and a GSP may be selectively used in combination.

The camera unit 21 is fixed to a central upper portion of a front area in a cabin of the host vehicle M. The camera unit 21 includes an onboard camera (stereo camera) including a main camera 21*a* and a sub-camera 21*b*, an image processing unit (IPU) 21*c*, and the ahead-of-vehicle traveling environment recognition unit 21*d*. The cameras 21*a* and 21*b* are disposed at left-right symmetrical positions on either side of the center in the vehicle width direction with a predetermined baseline length. The cameras 21*a* and 21*b* are both wide-angle cameras that can capture a wide range to the left and right in the vehicle width direction immediately ahead of the host vehicle M, as indicated by the dot-dash lines in FIG. 1.

The camera unit 21 executes predetermined image processing via the IPU 21*c* on traveling environment image information captured for a predetermined imaging region If (see FIGS. 3 to 6) ahead of the host vehicle M by the cameras 21*a* and 21*b*. The ahead-of-vehicle traveling environment recognition unit 21*d* reads the traveling environment image information after image processing by the IPU 21*c*, and recognizes and acquires ahead-of-vehicle traveling environment information on the basis of the traveling environment image information. Examples of the acquired ahead-of-vehicle traveling environment information include the shape of the road where the host vehicle M travels (road curvature (1/m) at the center of the lane marking defining the left and right, width (vehicle width) between the left/right lane markings), stationary targets including intersections, road signs, and pedestrian crossings, moving targets (e.g., pedestrians and bicycles), preceding vehicles traveling ahead, and oncoming vehicles traveling in the oncoming lane.

Note that the camera unit 21 may be a monocular camera including only the main camera 21*a*. Further, instead of the sub-camera 21*b*, an ultrasonic wave sensor, a millimeter wave radar, a microwave radar, an infrared sensor, a laser radar, light detection and ranging (LiDAR), or a combination of two or more thereof may be used to search in a wide area ahead of the host vehicle M and recognize the ahead-of-vehicle traveling environment information via the ahead-of-vehicle traveling environment recognition unit 21*d*.

The driving assist control unit 11 is coupled to, at an input side, the ahead-of-vehicle traveling environment recognition unit 21*d* of the camera unit 21, an inter-vehicle communication unit 12, and a host vehicle state sensor 13. The inter-vehicle communication unit 12 performs communication with other vehicles, such as a preceding vehicle or an oncoming vehicle, and acquires information relating to the operating state of the other vehicles. Note that the inter-vehicle communication unit 12 corresponds to an oncoming vehicle information acquisition unit of the present disclosure, or the ahead-of-vehicle traveling environment recognition unit 21*d* of the camera unit 21 described above also functions as the oncoming vehicle information acquisition unit of the present disclosure.

The host vehicle state sensor 13 is a generic name for a sensor group that detects various states relating to the host vehicle M. Examples of the host vehicle state sensor 13 include a vehicle speed sensor that detects the vehicle speed (speed of vehicle) of the host vehicle M, a steering angle sensor that detects the steering angle of the host vehicle M, a yaw rate sensor that detects the yaw rate that acts on the vehicle body, an accelerator pedal position sensor that detects the amount by which the accelerator pedal is depressed, and a signal or the like from a brake switch that turns on when the brake pedal is depressed or a blinker switch that turns the left and right blinkers on/off.

The driving assist control unit 11 is coupled to, at an output side, a steering controller 31 that assists the steering wheel operation of the driver by driving electric power steering (EPS), a brake controller 32 that decelerates the host vehicle M via forced braking, an acceleration/deceleration controller 33 that controls the output of a driving source (engine, electric motor, or the like) installed in the host vehicle M, and a notification device 34 that notifies the driver of necessary information via audio or images.

The driving assist control unit 11, from the ahead-of-vehicle traveling environment information recognized via the ahead-of-vehicle traveling environment recognition unit 21*d* of the camera unit 21, recognizes road signs standing on the road shoulder and the intersections ahead of the vehicle and recognizes road markings indicating the traffic divisions for each travel direction marked in the traveling lanes and oncoming lanes before an intersection (see FIGS. 3 to 6).

In a case where the driving assist control unit 11 detects an intersection ahead of the host vehicle M while the host vehicle M is traveling in driving assist mode, the driving assist control unit 11 checks whether the host vehicle M is going to turn right. Then, in a case where the driving assist control unit 11 determines that the host vehicle M is going to turn right, an oncoming vehicle F traveling in the oncoming lane is recognized.

Next, the driving assist control unit 11 checks whether there is a possibility of contact between the host vehicle M and the recognized oncoming vehicle F. In a case where the driving assist control unit 11 determines that no contact is imminent between the oncoming vehicle F and the host vehicle M, travel in the right-turn direction is continued. In a case where the driving assist control unit 11 determines that there is a high possibility of contact between the host vehicle M and the oncoming vehicle F, forced braking is activated and the host vehicle M is stopped and made to wait until the oncoming vehicle F passes.

Figure 2A:
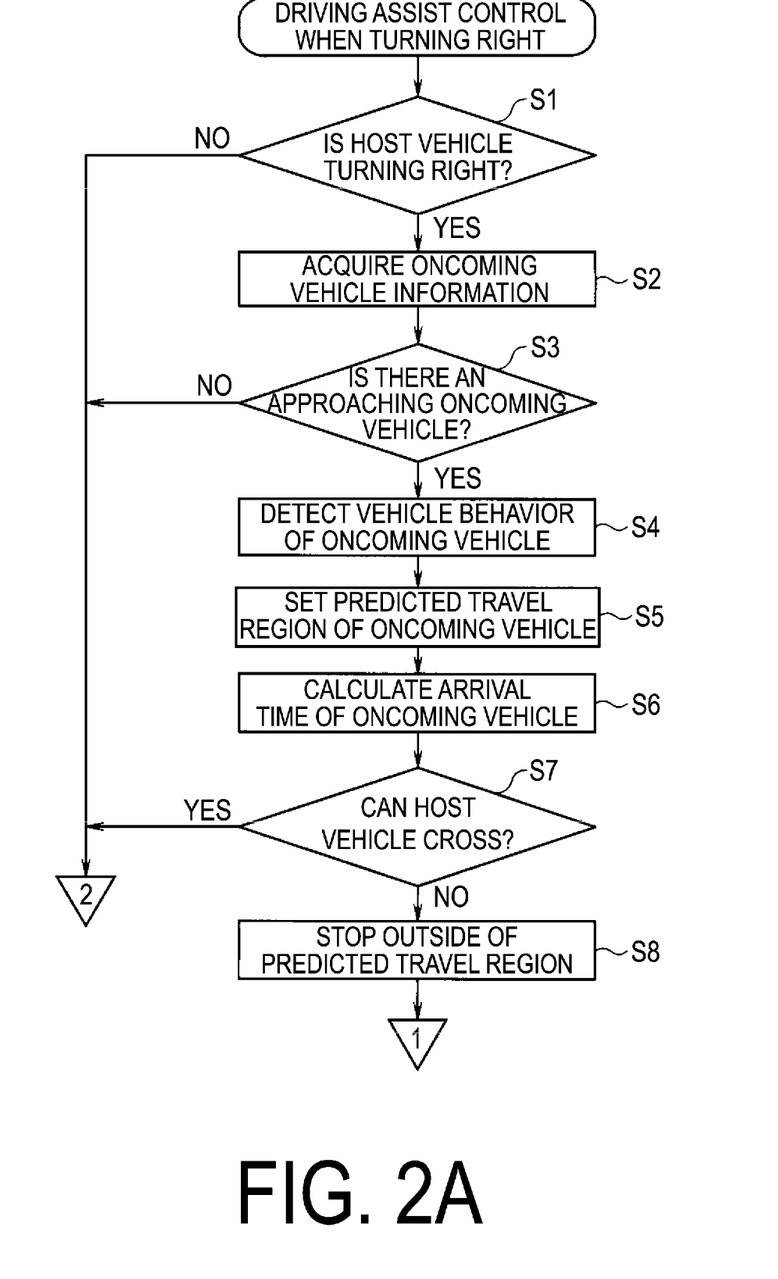
FIG. 2A is a flowchart (part 1) illustrating a turning right driving assist control routine.
Figure 2B:
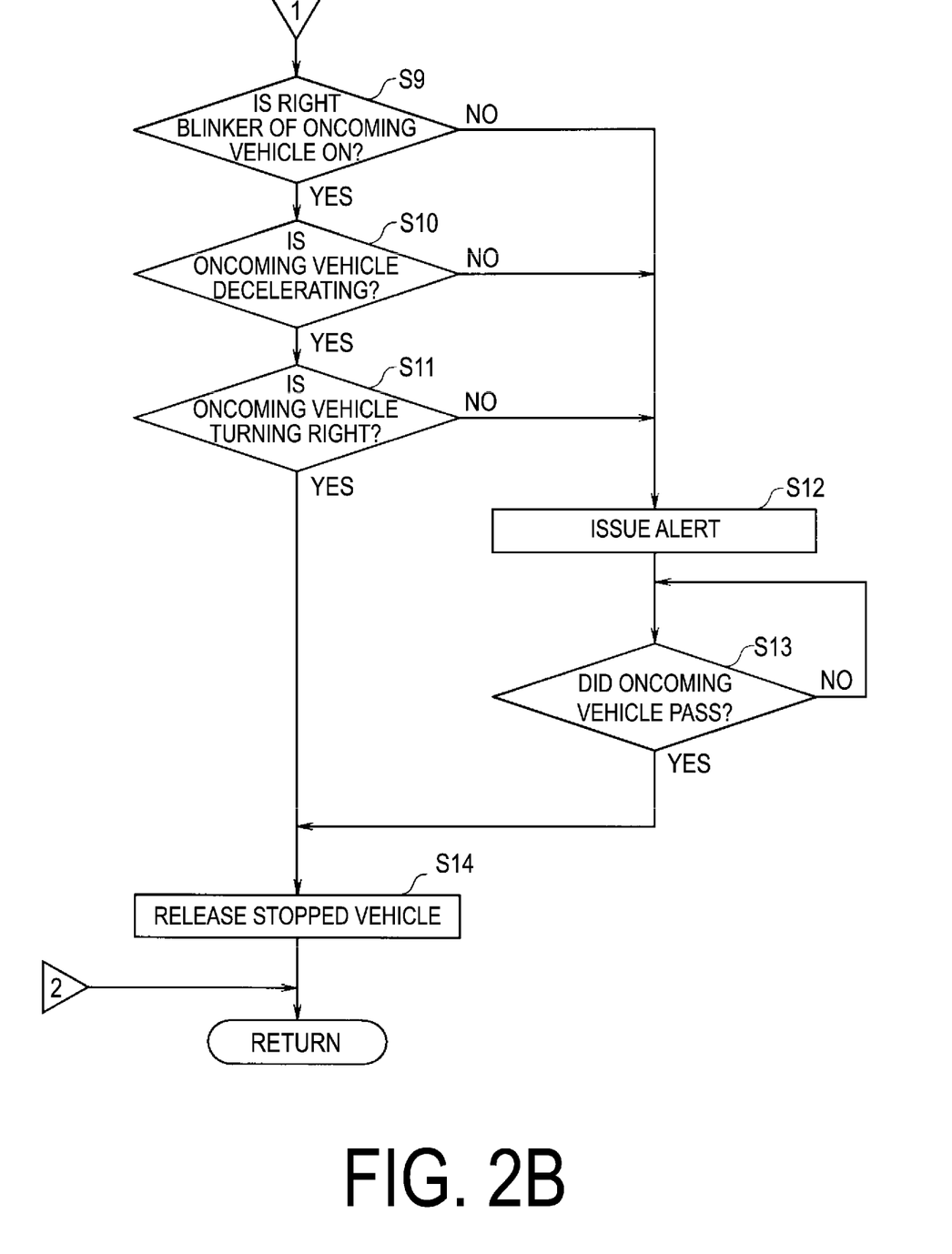
FIG. 2B is a flowchart (part 2) illustrating the turning right driving assist control routine.

In one example, the above-described driving assistance performed by the driving assist control unit 11 before entering an intersection is performed in accordance with a pre-intersection-entry driving assist control routine illustrated in FIGS. 2A and 2B. Note that the processing of this routine is handled by a driving assist controller of the present disclosure.

This routine starts in a case where it is determined that the host vehicle M has entered an intersection in the main routine. Note that entry to the intersection is determined on the basis of the ahead-of-vehicle traveling environment information recognized by the ahead-of-vehicle traveling environment recognition unit 21d of the camera unit 21. Also, in a case where the host vehicle M is installed with a car navigation system, this determination may be performed on the basis of road map information of the car navigation system. Note that the ahead-of-vehicle traveling environment recognition unit 21d and the road map information correspond to a traveling environment information acquisition unit of the present disclosure.

Then, in the main routine, when it is determined that the host vehicle M has entered an intersection and this routine is started, first in step S1, it is determined whether the host vehicle M is going to turn right by the driver operating the host vehicle M from the vehicle behavior (information including right blinker light, steering wheel operation, vehicle speed, and traffic division of lane traveling in) of the host vehicle M. Alternatively, it is determined whether the driving assist control unit 11 intends to make the host vehicle M turn right in accordance with a preset target travel path.

In step S1, in a case where it is determined that the host vehicle M is going to turn right, the processing proceeds to step S2. In a case where the host vehicle M is heading straight ahead or going to turn left, the routine ends. In step S2, oncoming vehicle information is acquired that indicates whether the oncoming vehicle F approaching the intersection is present. The oncoming vehicle information is acquired from the ahead-of-vehicle traveling environment information recognized by the ahead-of-vehicle traveling environment recognition unit 21d of the camera unit 21 and the travel information of the oncoming vehicle F received by the inter-vehicle communication unit 12.

Subsequently, the processing proceeds to step S3, and whether an oncoming vehicle approaching in the oncoming lane within a range distanced from the intersection by a predetermined distance (for example, from 30 to 50 m) is present is checked on the basis of the oncoming vehicle information. Then, in a case where the approaching oncoming vehicle F is detected, the processing proceeds to step S4. In a case where the oncoming vehicle F is not detected, the routine ends, and the course change to the right-turn direction of the host vehicle M is continued.

Then, in step S4, the vehicle behavior of the oncoming vehicle F is detected. The vehicle behavior of the oncoming vehicle F is the amount of change in the position of the oncoming vehicle F over time and is detected on the basis of the ahead-of-vehicle traveling environment information recognized by the ahead-of-vehicle traveling environment recognition unit 21d of the camera unit 21 and the travel information of the oncoming vehicle F received by the inter-vehicle communication unit 12. The travel trajectory of the oncoming vehicle F can be obtained by performing approximation using interpolation polynomial or using a method of least squares, on the vehicle behavior.

Subsequently, the processing proceeds to step S5, and a predicted travel region of the oncoming vehicle F is set on the basis of the vehicle behavior of the oncoming vehicle F, the lane information of the oncoming lane, and the road information of the intersection (a three-way junction, a four-way junction, right turn prohibited, and the like). Note that the lane information of the oncoming lane and the intersection information of the intersection are acquired from the ahead-of-vehicle traveling environment information recognized by the ahead-of-vehicle traveling environment recognition unit 21d of the camera unit 21 and the road map information of the car navigation system in a case where a car navigation system is installed. The processing of steps S3 and S5 is handled by a predicted travel region setting unit of the present disclosure.

Figure 3:
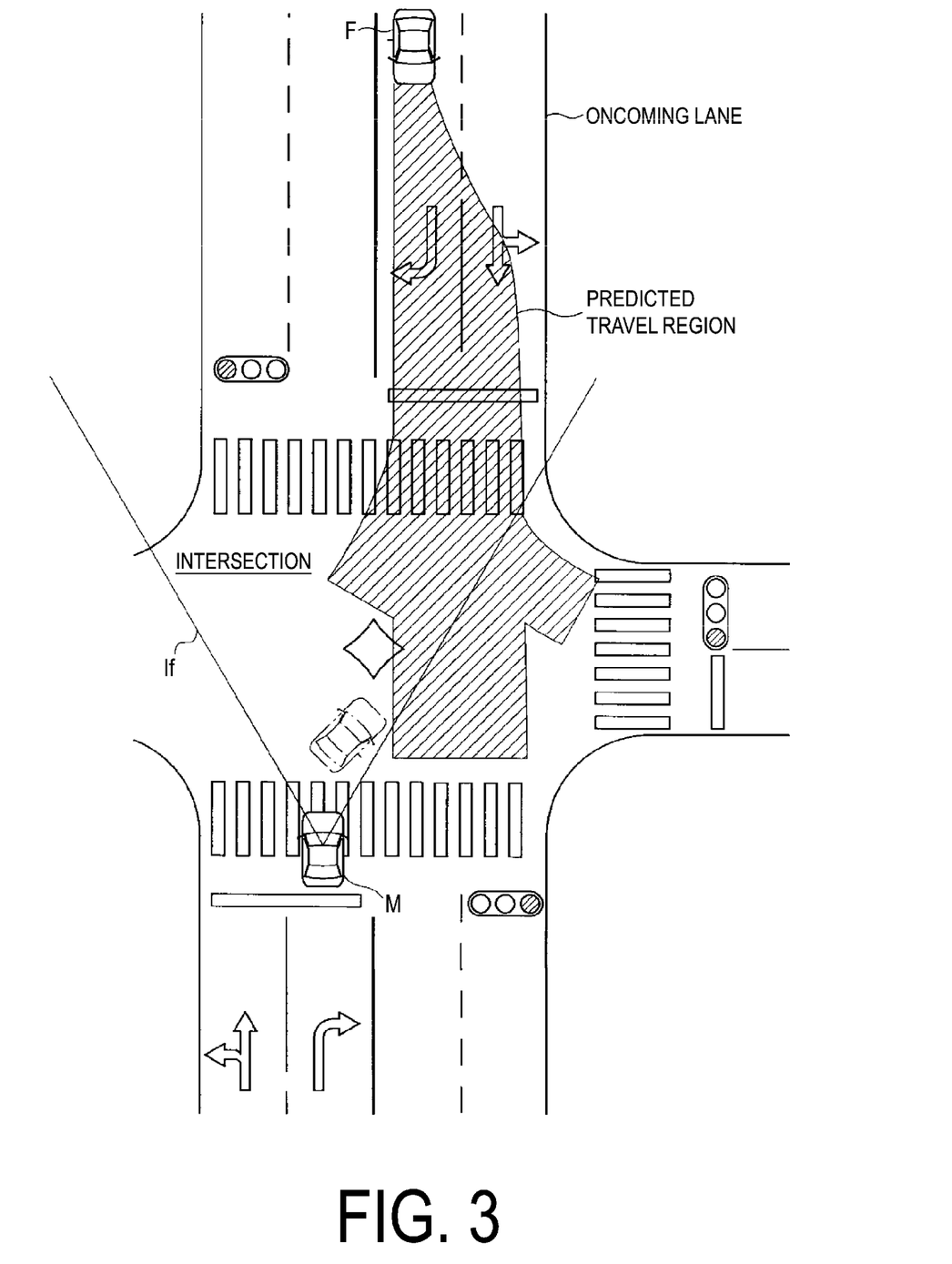
FIG. 3 illustrates a predicted travel region of an oncoming vehicle traveling in a set oncoming lane when a host vehicle is going to turn right.

As illustrated in FIG. 3, in a case where the oncoming vehicle F is located relatively far from the intersection, the predicted travel region in the intersection is a relatively wide area due to it being difficult to identify whether the oncoming vehicle F will travel straight ahead or turn left or right. On the other hand, as illustrated in FIGS. 4 and 5, as the oncoming vehicle F approaches the intersection and then enters the intersection, the area of the predicted travel region narrows.

Figure 4:
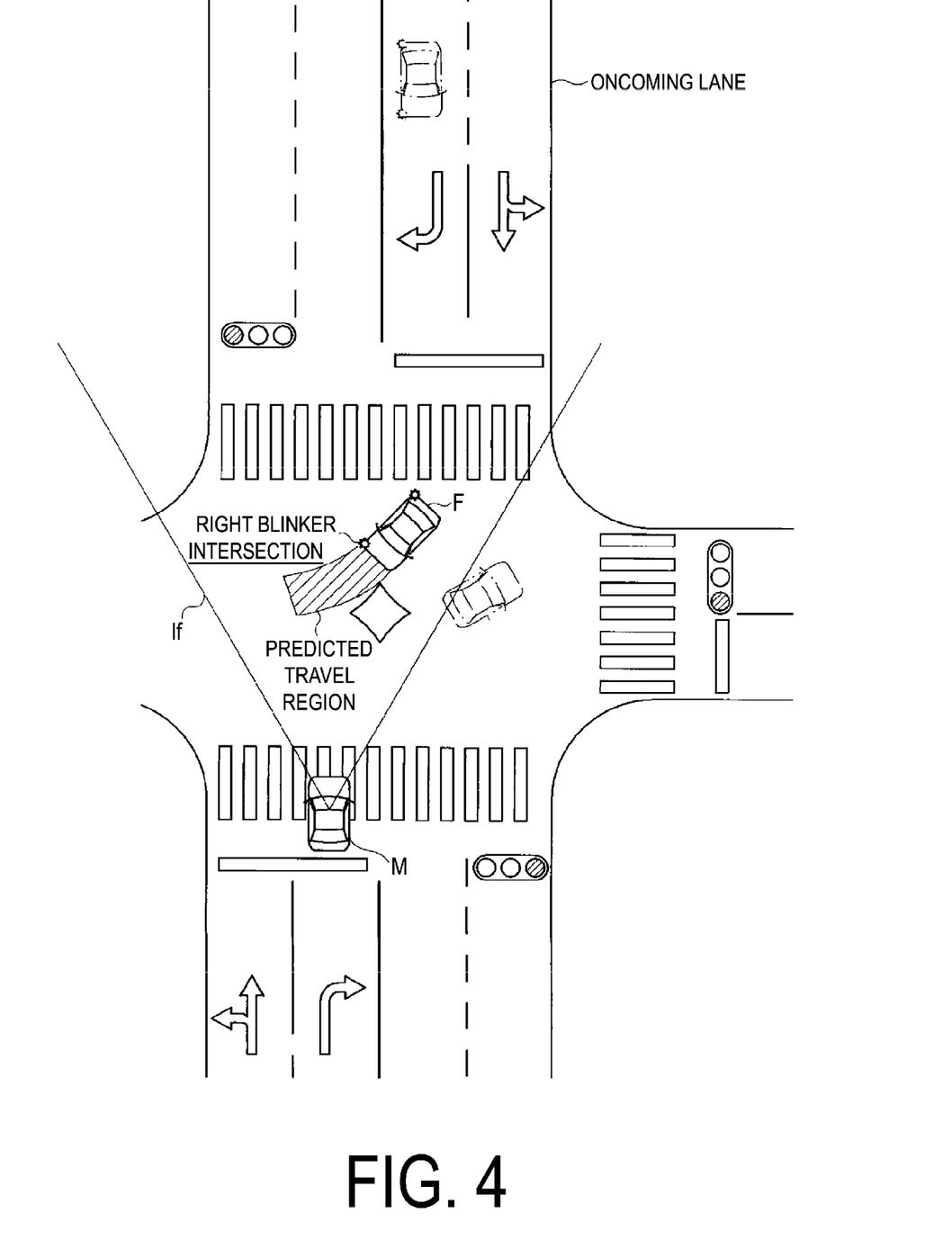
FIG. 4 illustrates a predicted travel region of an oncoming vehicle going to turn right after entering a set intersection when the host vehicle is going to turn right.
Figure 5:
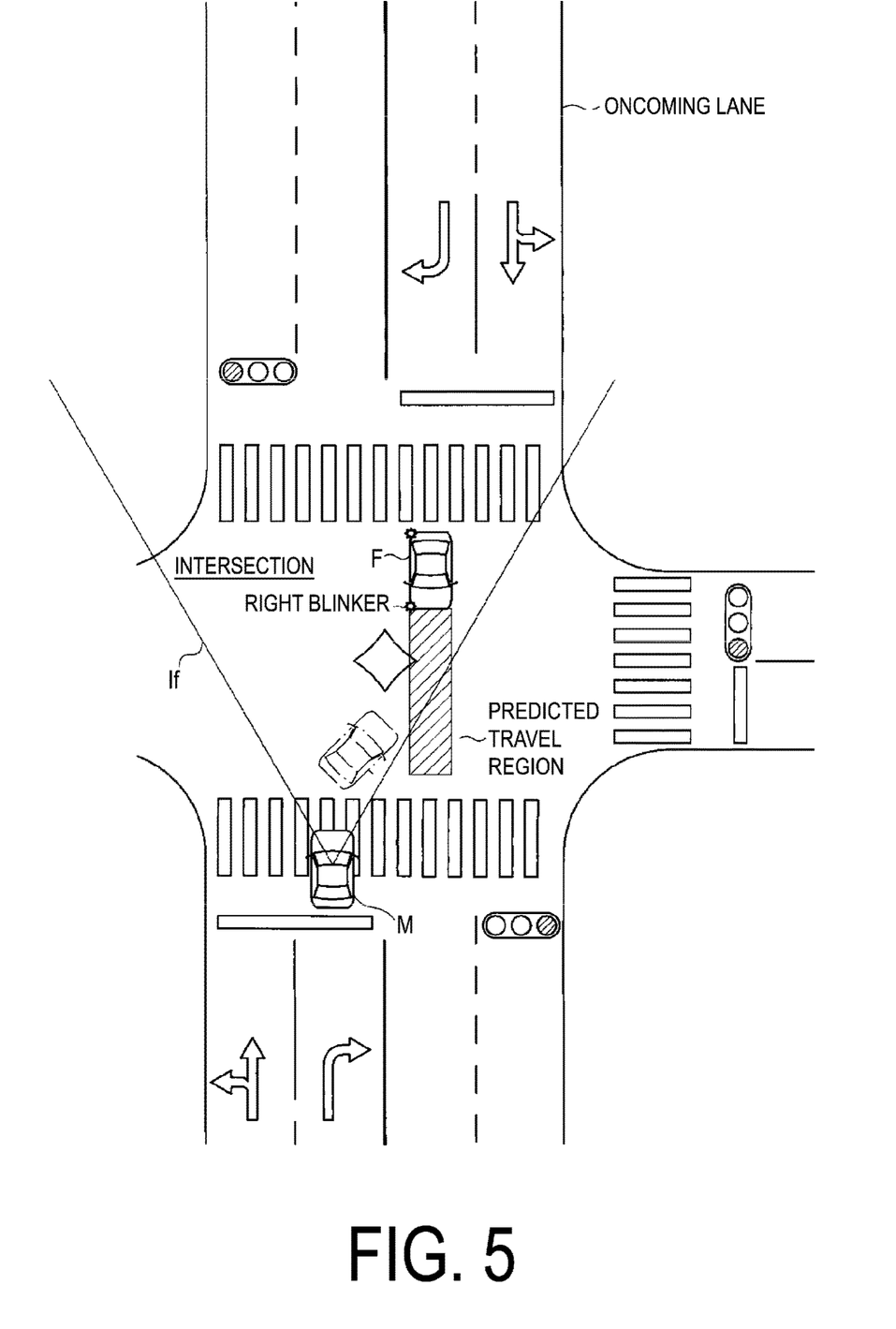
FIG. 5 illustrates a predicted travel region of an oncoming vehicle going to travel straight ahead after entering a set intersection when the host vehicle is going to turn right.
Figure 6:
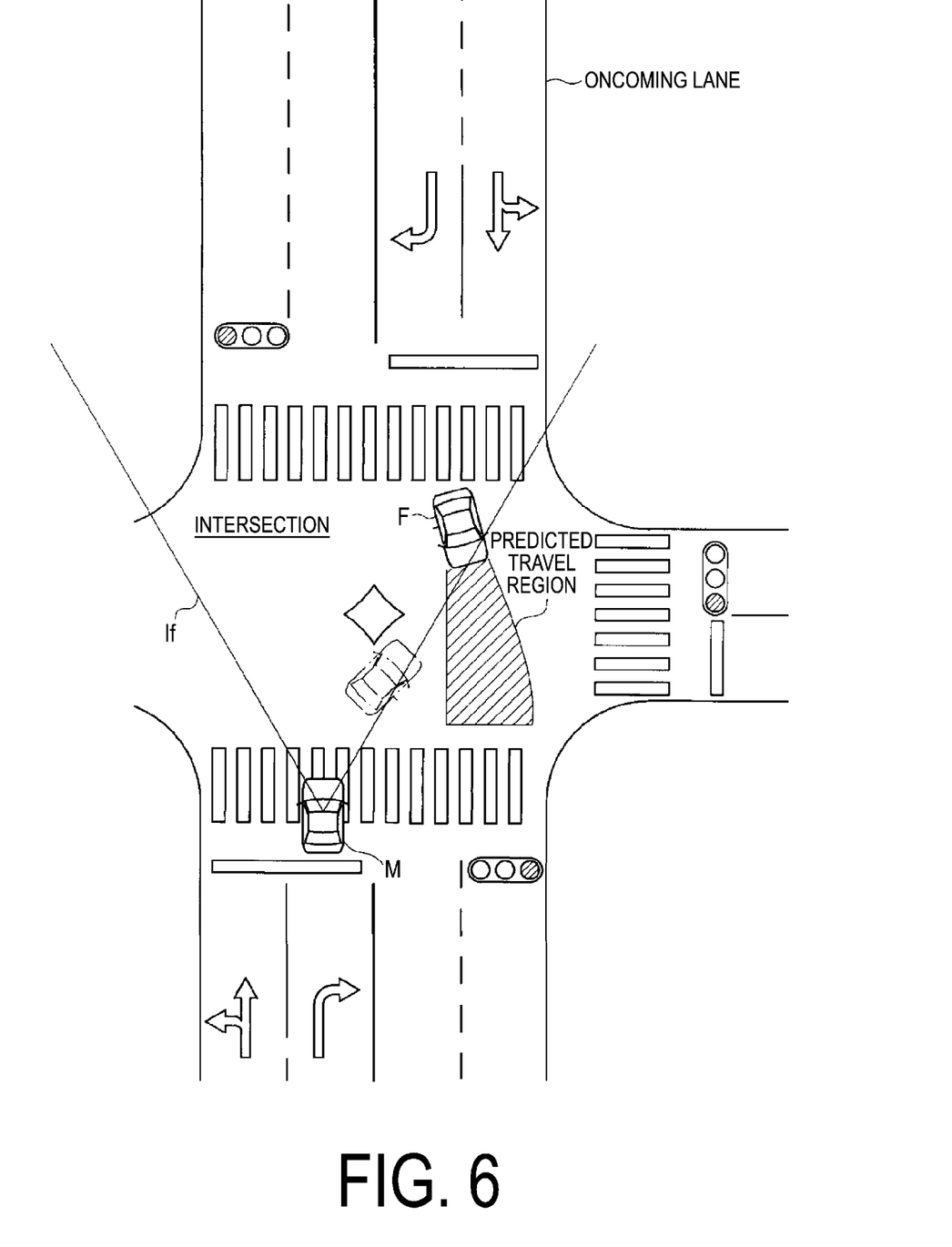
FIG. 6 illustrates a predicted travel region of an oncoming vehicle going to change course after entering an intersection when the host vehicle is going to turn right.

In this case, as illustrated in FIG. 4, in a case where the oncoming vehicle F is traveling in a right turn only lane with the right blinker on and enters the intersection, it can be determined that there is a high possibility that the oncoming vehicle F will turn right. However, as illustrated in FIG. 5, it is plausible that an action that deviates from the prediction of the driver of the host vehicle M occurs. An example of such vehicle behavior includes the oncoming vehicle F having entered the intersection with the right blinker on and advancing in the straight ahead direction without turning right. Also, as illustrated in FIG. 6, another plausible example of action that deviates from prediction includes changing course to the adjacent lane after having entered the intersection from the right turn only lane.

Subsequently, the processing proceeds to step S6, and the arrival time at the position where the host vehicle M is going to cross the oncoming lane is calculated on the basis of the relative distance between the host vehicle M and the oncoming vehicle F and the vehicle speed of the oncoming vehicle F. Then, in step S7, the time when the host vehicle M at a slow speed will enter the predicted travel region of the oncoming vehicle F and the arrival time of the oncoming vehicle F are compared. In a case where both times are separated by a predetermined amount, it is determined that the host vehicle M can cross the oncoming lane without contact. Then, the routine ends, and the course change to the right-turn direction is continued.

On the other hand, in a case where the both times are close or the same, there is a high possibility of contact. Thus, it is determined that crossing the oncoming lane is not possible, and the processing proceeds to step S8. Note that the processing of steps S6 and S7 is handled by a contact determination unit of the present disclosure.

In step S8, the host vehicle M is stopped outside of the predicted travel region. In the stopping control of the host vehicle M, the driving assist control unit 22 causes the brake controller 32 and the acceleration/deceleration controller 33 to operate and perform control on the basis of the distance from the host vehicle M to the predicted travel region and the speed of the host vehicle. Then, as illustrated by the dot-dash line in FIGS. 3, 5, and 6, the host vehicle M is stopped outside of the predicted travel region.

Thereafter, the processing proceeds to step S9, and in steps S9 to S11, whether the oncoming vehicle is actually going to turn right is checked. Note that the processing of steps S9 to S11 is handled by a course change determination unit of the present disclosure.

That is, first in step S9, whether the right blinker of the oncoming vehicle F is on is checked. In a case where the right blinker is on, it is determined that there is a possibility of a right turn, and the processing proceeds to step S10. In a case where the right blinker is not on, there is a possibility of straight ahead travel or course change (see FIG. 6). Thus, it is determined that the possibility of a right turn is low, and the processing branches to step S12. Note that whether the right blinker of the oncoming vehicle F is on is checked on the basis of the ahead-of-vehicle traveling environment information recognized by the ahead-of-vehicle traveling environment recognition unit 21d of the camera unit 21 and the travel information of the oncoming vehicle F received by the inter-vehicle communication unit 12.

In step S10, whether the oncoming vehicle F is decelerating before the intersection is checked. Whether the oncoming vehicle F is decelerating is checked on the basis of the change in movement amount per unit time of the oncoming vehicle F from the ahead-of-vehicle traveling environment information recognized by the ahead-of-vehicle traveling environment recognition unit 21d of the camera unit 21. Alternatively, this is checked on the basis of the travel information (change in speed over time of the oncoming vehicle detected by the vehicle speed sensor) of the oncoming vehicle F received by the inter-vehicle communication unit 12.

In a case where it is determined that the oncoming vehicle F is decelerating, the processing proceeds to step S11. In a case where the oncoming vehicle F is not decelerating, the possibility of the oncoming vehicle F travel straight ahead is high. Thus, it is determined that the possibility of a right turn is low (see FIG. 5), and the processing branches to step S12. In step S11, whether the oncoming vehicle F is being steered to the right-turn direction is checked. Whether the oncoming vehicle F is being steered to the right-turn direction is checked on the basis of the change in movement amount per unit time of the oncoming vehicle F from the ahead-of-vehicle traveling environment information recognized by the ahead-of-vehicle traveling environment recognition unit 21d of the camera unit 21. Alternatively, this is checked on the basis of the travel information (steering angle detected by the steering angle sensor) of the oncoming vehicle F received by the inter-vehicle communication unit 12.

Also, as illustrated in FIG. 4, in a case where the oncoming vehicle F maneuvers to turn right and the predicted travel path is set to the right-turn direction, it is determined that the host vehicle M can cross the oncoming lane, and the processing proceeds to step S14. In a case where it is determined that the oncoming vehicle F is not maneuvering to turn right, it is determined that the possibility of a right turn is low, and the processing branches to step S12.

In a case where the processing branches to step S12 from either one of step S9 to S11, the driving assist control unit 22 issues, from the notification device 34, an alert saying "an oncoming vehicle is approaching" or the like for prompting the driver to pay attention. Then the processing proceeds to step S13. In step S13, whether the oncoming vehicle F has passed over the travel path of the host vehicle M where it crosses the oncoming lane is checked, and the host vehicle M waits until the oncoming vehicle F has passed the travel path of the host vehicle M. In a case where it is determined that the passing of the oncoming vehicle F has been detected, the processing proceeds to step S14. Whether the oncoming vehicle F has passed the travel path of the host vehicle M is determined on the basis of an image of the oncoming vehicle F acquired from the ahead-of-vehicle traveling environment information recognized by the ahead-of-vehicle traveling environment recognition unit 21d of the camera unit 21. Alternatively, this may be determined from the relative positional relationship between position information of the oncoming vehicle F received by the inter-vehicle communication unit 12 and the host vehicle position.

Then, in a case where the processing proceeds from step S11 or step S13 to step S14, the stopped state of the host vehicle M is released, and the routine ends. As a result, the driving assist control unit 22 advances the host vehicle M and makes it cross the oncoming lane at a slow speed. Alternatively, in a case where the driver is driving the host vehicle M by himself/herself, the driver operates the accelerator pedal and advances the host vehicle M to the direction crossing the oncoming lane. Note that the processing of steps S8 to S14 is handled by a stopping controller of the present disclosure.

In this manner, in the present embodiment, in a case where the host vehicle M goes to turn right and an approaching oncoming vehicle is detected, first, the predicted travel region of the oncoming vehicle F in the intersection is set on the basis of the vehicle behavior of the oncoming vehicle F. Then, whether the host vehicle M and the oncoming vehicle F will come into contact in the predicted travel region is checked. If there is a possibility of contact or rubbing, the host vehicle M is stopped outside of the predicted travel region. In a case where there is no possibility of contact between the host vehicle M and the oncoming vehicle F, the oncoming vehicle F is allowed to cross the oncoming lane.

In this manner, contact with an oncoming vehicle can be avoided without flustering a driver and occupant, allowing the host vehicle M to safely cross, even in a case where the oncoming vehicle F travels in a manner that deviates from a blinker light and the road travel information, such as traveling in a right turn only lane.

Note that the present disclosure is not limited to the embodiments described above, and, for example, the present disclosure can be applied to intersections that are a three-way junction or a five-way or larger junction. Also, in a case where oncoming vehicles F are detected, whether each one of the oncoming vehicles F will come into contact with the host vehicle M is determined.

The invention claimed is:

1. A driving assist device comprising:
one or more processors; and
one or more memories including instructions, when executed, causing the one or more processors to be configured to:
acquire traveling environment information about a traveling environment ahead of a vehicle;
acquire information about an oncoming vehicle traveling in an oncoming lane;
perform driving assistance when the vehicle changes a course by crossing the oncoming lane;
set a predicted travel region based on vehicle behavior of the oncoming vehicle when the vehicle enters an intersection and the oncoming vehicle, which enters the intersection, approaching the vehicle is detected based on the information about the oncoming vehicle;
when the vehicle enters the predicted travel region in a travel path of the vehicle, determine whether there is a possibility of contact between the vehicle and the oncoming vehicle based on the predicted travel region and the travel path of the vehicle;
bring the vehicle to a stopped state outside of the predicted travel region when determining that there is the possibility of the contact between the vehicle and the oncoming vehicle;
after the vehicle enters the stopped state, determine whether all conditions for the oncoming vehicle are met, wherein all the conditions include lighting of a blinker indicating a turn toward an inner side of the intersection, deceleration when entering the intersection, and steering toward the inner side of the intersection;
in response to determining that all the conditions are met, allow the vehicle to resume moving along the travel path;
in response to determining that all the conditions are not met, determine whether the oncoming vehicle has passed the travel path where the vehicle crosses the oncoming lane;
in response to determining that the oncoming vehicle has passed the travel path where the vehicle crosses the oncoming lane, allow the vehicle to resume moving along the travel path; and
in response to determining that the oncoming vehicle has not passed the travel path where the vehicle crosses the oncoming lane, maintain the stopped state of the vehicle.

2. A driving assist device comprising circuitry configured to:
acquire traveling environment information about a traveling environment ahead of a vehicle;
acquire information about an oncoming vehicle traveling in an oncoming lane;
perform driving assistance when the vehicle changes a course by crossing the oncoming lane;
set a predicted travel region based on vehicle behavior of the oncoming vehicle when the vehicle enters an intersection and the oncoming vehicle, which enters the intersection, approaching the vehicle is detected based on the information about the acquired oncoming vehicle;
when the vehicle enters the predicted travel region in a travel path of the vehicle, determine whether there is a possibility of contact between the vehicle and the oncoming vehicle based on the set predicted travel region and the travel path of the vehicle;
upon determining there is a possibility of the contact between the vehicle and the oncoming vehicle, bring the vehicle to a stopped state outside of the predicted travel region;
after the vehicle enters the stopped state, determine whether all conditions for the oncoming vehicle are met, wherein all the conditions include lighting of a blinker indicating a turn toward an inner side of the intersection, deceleration when entering the intersection, and steering toward the inner side of the intersection;
in response to determining that all the conditions are met, allow the vehicle to resume moving along the travel path;
in response to determining that all the conditions are not met, determine whether the oncoming vehicle has passed the travel path where the vehicle crosses the oncoming lane;
in response to determining that the oncoming vehicle has passed the travel path where the vehicle crosses the oncoming lane, allow the vehicle to resume moving along the travel path; and
in response to determining that the oncoming vehicle has not passed the travel path where the vehicle crosses the oncoming lane, maintain the stopped state of the vehicle.

3. The driving assist device according to claim 1, wherein the predicted travel region has (1) a width that is greater than a width of the oncoming vehicle and (2) protrusions, and wherein the predicted travel region encompasses multiple potential behaviors of the oncoming vehicle in the intersection including directions in which the oncoming vehicle proceeds, and
wherein the one or more processors are further configured to adjust (1) the width of the predicted travel region based on the behavior of the oncoming vehicle as the oncoming vehicle proceeds within the intersection and (2) a number of the protrusions, wherein when the width of the predicated travel region and the number of the protrusions are reduced compared to a previous predicted travel region, a reduced width of, and the reduced number of the protrusions of, the predicated travel region encompass fewer potential behaviors of the oncoming vehicle than the previous predicted travel region.

4. The driving assist device according to claim 2, wherein the predicted travel region has (1) a width that is greater than a width of the oncoming vehicle and (2) protrusions, and wherein the predicted travel region encompasses multiple potential behaviors of the oncoming vehicle in the intersection including directions in which the oncoming vehicle proceeds, and
wherein the circuitry is configured to adjust (1) the width of the predicted travel region based on the behavior of the oncoming vehicle as the oncoming vehicle proceeds within the intersection and (2) a number of the protrusions, wherein when the width of the predicated travel region and the number of the protrusions are reduced compared to a previous predicted travel region, a reduced width of, and the reduced number of the protrusions of, the predicated travel region encompass fewer potential behaviors of the oncoming vehicle than the previous predicted travel region.

5. A driving assist device comprising circuitry configured to:
- acquire traveling environment information about a traveling environment ahead of a vehicle;
- acquire information about an oncoming vehicle traveling in an oncoming lane;
- perform driving assistance when the vehicle changes a course by crossing the oncoming lane;
- set a predicted travel region based on vehicle behavior of the oncoming vehicle when the vehicle enters an intersection and the oncoming vehicle, which enters the intersection, approaching the vehicle is detected based on the information about the acquired oncoming vehicle;
- when the vehicle enters the predicted travel region in a travel path of the vehicle, determine whether there is a possibility of contact between the vehicle and the oncoming vehicle based on the set predicted travel region and the travel path of the vehicle;
- upon determining there is a possibility of the contact between the vehicle and the oncoming vehicle, bring the vehicle to a stopped state outside of the predicted travel region;
- after the vehicle enters the stopped state, determine whether the oncoming vehicle has passed the travel path where the vehicle crosses the oncoming lane;
- in response to determining that the oncoming vehicle has passed the travel path where the vehicle crosses the oncoming lane, allow the vehicle to resume moving along the travel path;
- after the vehicle enters the stopped state, determine whether all conditions for the oncoming vehicle are met, wherein all the conditions include lighting of a blinker indicating a turn toward an inner side of the intersection, deceleration when entering the intersection, and steering toward the inner side of the intersection;
- in response to determining that all the conditions are met, allow the vehicle to resume moving along the travel path without the determining that the oncoming vehicle has passed the travel path where the vehicle crosses the oncoming lane, and
- in response to (1) determining that the oncoming vehicle has not passed the travel path where the vehicle crosses the oncoming lane, or (2) determining that all the conditions are not met, maintain the stopped state of the vehicle.

* * * * *